United States Patent
Pieroni et al.

(10) Patent No.: US 10,852,440 B2
(45) Date of Patent: Dec. 1, 2020

(54) DEVICES, SYSTEMS AND METHODS FOR DIGITALLY TRANSPORTING SIGNALS IN GNSS REPEATER SYSTEMS USING CPRI

(71) Applicant: Wireless Telecom Group, Inc., Parsippany, NJ (US)

(72) Inventors: Alejandro Pieroni, New Brunswick, NJ (US); Luke Getto, Chester, NJ (US); Andre Prazeres, Oxford, NJ (US); Phil Chen, Denville, NJ (US)

(73) Assignee: Wireless Telecom Group, Inc., Parsippany, NJ (US)

( * ) Notice: Subject to any disclaimer, the term of this patent is extended or adjusted under 35 U.S.C. 154(b) by 145 days.

(21) Appl. No.: 15/860,893

(22) Filed: Jan. 3, 2018

(65) Prior Publication Data

US 2018/0217265 A1    Aug. 2, 2018

Related U.S. Application Data

(60) Provisional application No. 62/444,223, filed on Jan. 9, 2017.

(51) Int. Cl.
| | |
|---|---|
| *G01S 19/11* | (2010.01) |
| *H04B 10/293* | (2013.01) |
| *H04B 7/212* | (2006.01) |
| *H04B 7/26* | (2006.01) |
| *H04B 10/2575* | (2013.01) |
| *G01S 19/23* | (2010.01) |

(52) U.S. Cl.
CPC ............ *G01S 19/11* (2013.01); *H04B 7/2125* (2013.01); *H04B 7/269* (2013.01); *H04B 10/2575* (2013.01); *H04B 10/293* (2013.01); *G01S 19/23* (2013.01)

(58) Field of Classification Search
CPC . H04W 88/085; H04W 56/001; H04W 28/06; H04W 40/00; H04W 76/10; H04J 3/0667; H04J 3/0697; H04J 3/0661; H04J 3/065; H04J 3/0655; H04J 14/0267; H04J 3/1652; H04L 43/106; H04B 10/25752; H04B 10/2575; H04Q 11/0066; H04Q 11/0067; H04Q 2213/1301
See application file for complete search history.

(56) References Cited

U.S. PATENT DOCUMENTS

| | | | |
|---|---|---|---|
| 8,705,634 B2 * | 4/2014 | Wegener | H03M 7/40 375/241 |
| 9,473,261 B1 * | 10/2016 | Tse | H04J 3/1658 |
| 9,525,482 B1 * | 12/2016 | Tse | H04B 10/0795 |

(Continued)

*Primary Examiner* — Olumide Ajibade Akonai
(74) *Attorney, Agent, or Firm* — McCarter & English, LLP

(57) ABSTRACT

Disclosed are devices, systems, apparatuses, methods, products, and other implementations of GNSS repeater systems and methods for improving phase and frequency alignment of RF signals transported through fiber optic communication channels. Acquired RF signals are processed at a remote outdoor unit, where they are digitized, formatted into a CPRI frame, and timestamped. The timestamped CPRI frame is then transported over a fiber optic communication channel to an indoor head end unit. The indoor head end unit extracts timestamp and digitized RF signal from the CPRI frame. The timestamp is then used to synchronize a base transceiver station (BTS) and a precision time protocol (PTP) grand master with the remote outdoor unit.

29 Claims, 11 Drawing Sheets

(56) References Cited

U.S. PATENT DOCUMENTS

| | | | | |
|---|---|---|---|---|
| 2012/0314797 | A1* | 12/2012 | Kummetz | H04L 27/34 |
| | | | | 375/295 |
| 2013/0100948 | A1* | 4/2013 | Irvine | H04J 3/0632 |
| | | | | 370/350 |
| 2013/0154877 | A1* | 6/2013 | Hwang | H04W 56/0025 |
| | | | | 342/357.22 |
| 2013/0266323 | A1* | 10/2013 | Tan | H04J 3/0682 |
| | | | | 398/115 |
| 2015/0104167 | A1* | 4/2015 | Bottari | H04B 10/0775 |
| | | | | 398/16 |
| 2015/0207714 | A1* | 7/2015 | Ruffini | H04J 3/065 |
| | | | | 370/350 |
| 2015/0223060 | A1* | 8/2015 | Chiang | H04W 92/12 |
| | | | | 380/247 |

* cited by examiner

DEVICES, SYSTEMS AND METHODS FOR DIGITALLY TRANSPORTING SIGNALS IN GNSS REPEATER SYSTEMS USING CPRI

RELATED APPLICATIONS

The present application claims the benefit of U.S. Provisional Application Ser. No. 62/444,223 filed on Jan. 9, 2017, the entire disclosure of which is expressly incorporated herein by reference.

BACKGROUND

Global navigation satellite system (GNSS) repeater systems are typically constructed to provide access to GNSS signals in locations or areas where GNSS signals are not readily available. For example, a GNSS repeater system may provide access to GNSS signals in locations or areas that are indoors which have an obstructed view to the sky. A GNSS repeater system typically acquires a GNSS radio frequency (RF) signal, such as a for example a Global Positioning System (GPS) signal, from an antenna in the analog domain. The GPS signal is then transported from the antenna to other components in the repeater system that re-distribute the GPS signal to areas or locations where it would otherwise be unavailable.

However, GNSS repeater systems suffer from several drawbacks. The GNSS signals are typically transported throughout the repeater system in the analog domain without being digitized. The signal to noise ratio of the re-distributed GNSS signals are thus poor, and the quality of the GNSS signals may degrade as they are transported across the repeater system. Further, analog systems typically require customized hardware that cannot be re-configured or reused when design requirements change. Additionally, in order to facilitate alerts and notifications in an analog system, separate communication channels are typically built, adding to overhead and resource consumption. For example, adding Ethernet connectivity to an analog system may require a separate and independent Ethernet communication channel.

Moreover, performance of system components has been known to degrade with variations in temperature. Further, the acquisition, transport, and retransmission of the GPS signals typically cause delays in the re-radiation of the GPS signals, which can lead to significant inaccuracies. Indeed, GNSS signals that are transported over long distances can cause a large timing misalignment across the system. The reduction of such timing misalignment between base stations is becoming increasingly critical in light of the demanding timing requirements set forth in the 4G and 5G standards. Current systems and methods for measuring or estimating the timing offset manually are inefficient.

The links for transporting the GNSS signals are typically constructed of fiber optic communication channels. Such fiber optic communication channels may generally be single mode or multi-mode. However, transporting the GNSS signals in the analog domain makes it impossible to create GNSS repeater systems with multi-mode fiber optic links.

GNSS repeater systems also typically lack spatial and signal diversity and antennae redundancy. GNSS repeater systems are typically programmed to receive and re-distribute signals from a single GNSS constellation, such as for example the GPS, GLONASS, BeiDou, or Galileo constellations. However, once set to a particular constellation, GNSS repeater systems are not typically adaptable to receive and transport signals for a different constellation, or combinations of constellations. GNSS repeater systems also do not typically provide redundant antennas that would allow the system to switchover in the case of poor signal quality or detected errors. Indeed, GNSS repeater systems typically do not provide any on-board GNSS signal analysis for monitoring the signal's performance and health.

Accordingly, a need exists for systems and methods that are capable of distributing acquired GNSS signals digitally throughout a repeater system without signal degradation and accurately measuring and accounting for the delay in transporting an acquired GNSS signal to other components of a repeater system, such as an indoor head end unit. There is also a need for such systems and methods to be configurable to provide spatial and signal diversity as well as antennae redundancy.

SUMMARY

In various embodiments, the invention provides systems, methods, and apparatuses for improving phase and frequency alignment of RF signals transported through fiber optic communication channels. According to some embodiments of the invention, a GNSS repeater system includes an RF antenna for acquiring an RF signal, a remote outdoor unit coupled to the RF antenna, a fiber optic communication channel, and an indoor head end unit. The RF antenna can relay the acquired RF signal to the remote outdoor unit, which processes it and communicates it to the indoor head end unit over the fiber optic communication channel.

The remote outdoor unit includes a signal processor, a GNSS receiver, a software defined radio (SDR), a multiple-output clock synthesizer, a field-programmable gate array (FPGA), and a first small form-factor pluggable (SFP) port. The hardware is configured to pre-condition the RF signal received from the RF antenna and then pass the pre-conditioned RF signal to the GNSS receiver. The GNSS receiver processes the pre-conditioned RF signal and outputs a GPS-disciplined clock signal. The multiple-output clock synthesizer processes the GPS-disciplined clock signal and generates a system clock signal. The pre-conditioned RF signal is also passed to the SDR where it is digitized into in-phase and quadrature (I/Q) antenna data. The SDR passes the (I/Q) antenna data to the FPGA where it is formatted into a common public radio interface (CPRI) frame. A timestamp is generated based on the system clock signal, and inserted into a proprietary field of the CPRI frame. The SFP port converts the digital signal having the formatted CPRI frame into an optical signal having the CPRI frame, and outputs the optical signal having the CPRI frame.

The indoor head end unit includes a second SFP port, a second FPGA, a second multiple-output clock synthesizer, a second SDR, a second signal processor, and a head end output port. When the indoor head end receives the optical signal having the CPRI frame over the fiber optic communication channel, it uses the second SFP port to convert the optical signal into a recovered digital signal. The second FPGA can then extract the CPRI frame from the recovered digital signal, extract the timestamp from the CPRI frame, decode the CPRI frame into recovered I/Q antenna data, and output the timestamp and recovered I/Q antenna data. The communication delay between the remote outdoor unit and the indoor head end unit can be measured by the timestamp. The second multiple-output clock synthesizer generates a recovered clock signal from the recovered digital signal which is output to the second FPGA, the second SDR, and the second signal processor. The second SDR creates a reconstructed RF signal using the recovered I/Q antenna data. The second signal processor can condition the reconstructed RF signal which can then be output through the head end output port.

The reconstructed RF signal and the determined communication delay can be used by a base transceiver station (BTS) and a IEEE 1588 Precision Time Protocol (PTP) grand master to synchronize with the remote outdoor unit. The reconstructed RF signal is created to have phase and frequency characteristics that are in alignment with the acquired RF signal. In this way, the BTS, PTP grand master and the outdoor remote unit can be synchronized with a high degree of precision and accuracy.

BRIEF DESCRIPTIONS OF THE DRAWINGS

The objects and features of the invention can be better understood with reference to the following detailed description and accompanying figures.

DETAILED DESCRIPTION

The disclosed subject matter relates to a GNSS repeater system and method for improving phase and frequency alignment of RF signals transported through fiber optic communication channels. Acquired RF signals are processed at a remote outdoor unit, where they are digitized into in-phase and quadrature antenna data. The digitized RF signals are then formatted into a common public radio interface frame, timestamped, and transported to an indoor head end unit. The indoor head end unit extracts the timestamp, digitized RF signal from the common public radio interface frame and output reconstructed RF to one or more base transceiver station (BTS) and a precision time protocol (PTP) grand master. The phase, frequency, and timing of the BTS and the PTP grand master can be aligned with the remote outdoor unit at a high degree of precision and accuracy using the timestamp in the CPRI frame.

Figure 1A:
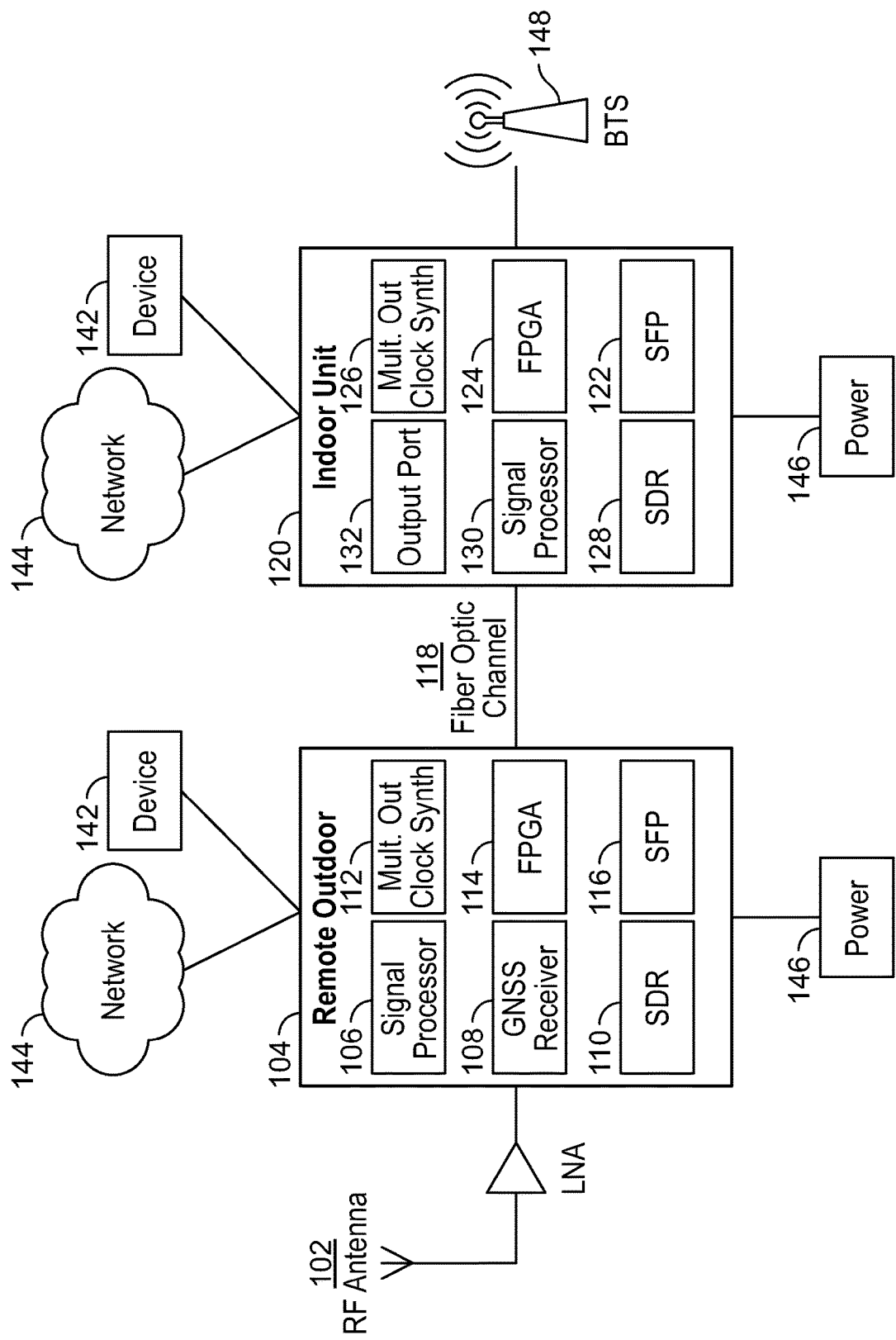
FIGS. 1A and 1B shows an exemplary system for improving phase and frequency alignment of RF signals transported through fiber optic communication channel according to embodiments of the invention.
Figure 1B:
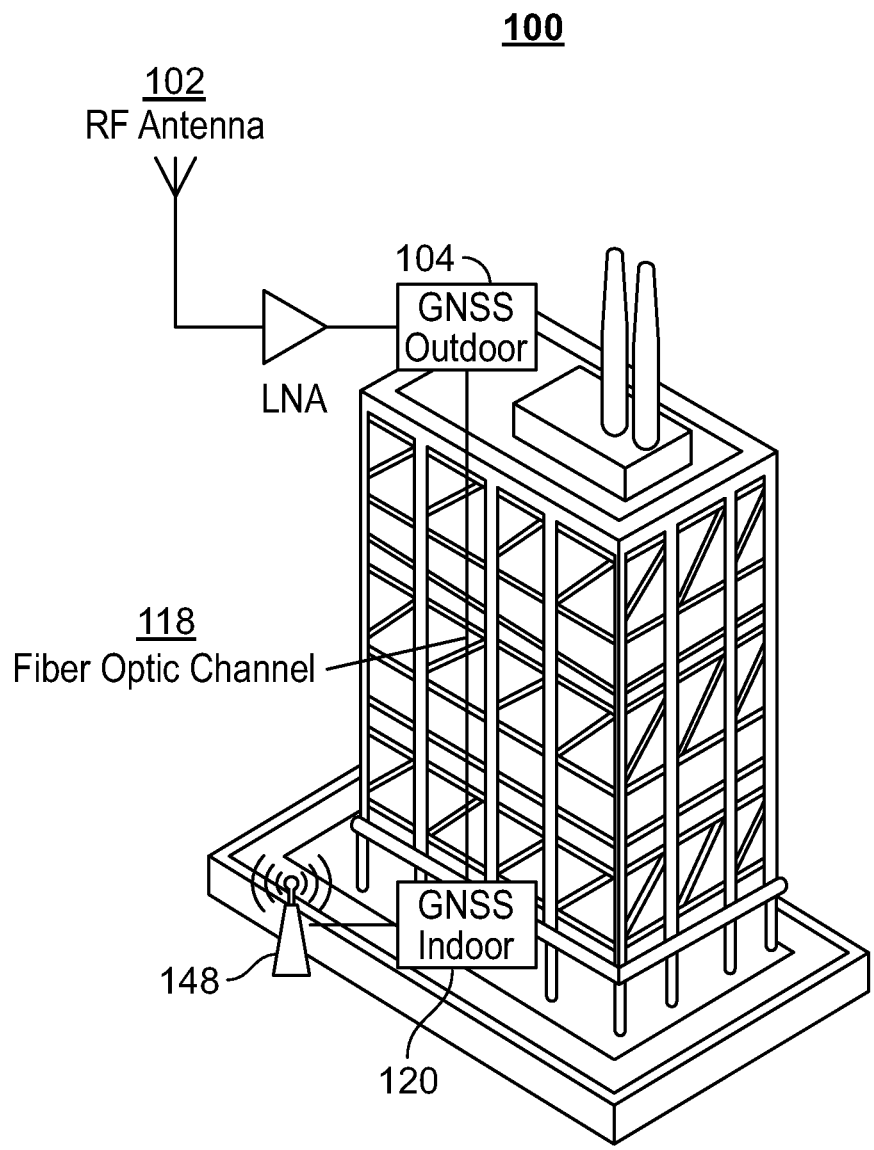

FIGS. 1A and 1B illustrate an exemplary system 100 for improving phase and frequency alignment of RF signals transported through fiber optic communication channel. According to some embodiments, the GNSS repeater can include an RF antenna 102, a remote outdoor unit 104 coupled to the RF antenna, a fiber optic communication channel 118, and an indoor head end unit 120. The RF antenna acquires an RF signal that corresponds to a GNSS signal and relays the acquired RF signal to the remote outdoor unit 104. RF antennae can be either passive or active antennae. In some embodiments, a low noise amplifier (LNA) amplifies the low-power, low-voltage signals acquired by the RF antenna, within the desired bandwidth. The remote outdoor unit 104 processes, digitizes, and formats the GNSS signal into a common public radio interface (CPRI) frame. The CPRI-formatted GNSS signal is transported with a timestamp over the fiber optic communication channel 118 to the indoor head end unit 120. The indoor head end unit 120 recovers the GNSS signal and uses the timestamp to determine the delay in transporting GNSS signal. In this way, the indoor head end unit 120 can generate a recovered clock signal that is phase and frequency aligned with the original GNSS signal received at the remote outdoor unit 104.

CPRI is a protocol for interfacing radio equipment and radio equipment controllers. The interface was designed for the purpose of facilitating mobile communications to and from baseband units in cellular networks. While CPRI has been used to facilitate communications between devices on a cell station tower, CPRI has not been integrated into GNSS repeater systems. Moreover, several barriers exist to integrating CPRI into a GNSS repeater system. For example, implementing a communication channel that conforms with the CPRI protocol is technologically difficult, consumes bandwidth thereby adding to overhead in the communication channels, and can be costly.

Using CPRI to communicate with baseband equipment typically requires knowledge of how equipment manufacturers encode the proprietary fields of the CPRI frame. However, vendors do not standardize the way they encode this field and often do not reveal how this field is encoded. Typically, the vendor specific proprietary field is reverse-engineered in order to be CPRI-compliant, which is extremely difficult and laborious.

Another challenge to integrating CPRI is the requirement that the clock signal be error-free and synchronized with a high degree of precision and accuracy. If a baseband unit receives a clock signal that is slightly distorted by noise or has drifted out of sync, it will not work. Thus, for at least the reasons stated above, integrating CPRI into applications such as GNSS repeater systems is unconventional, non-routine, and unknown.

Figure 2A:
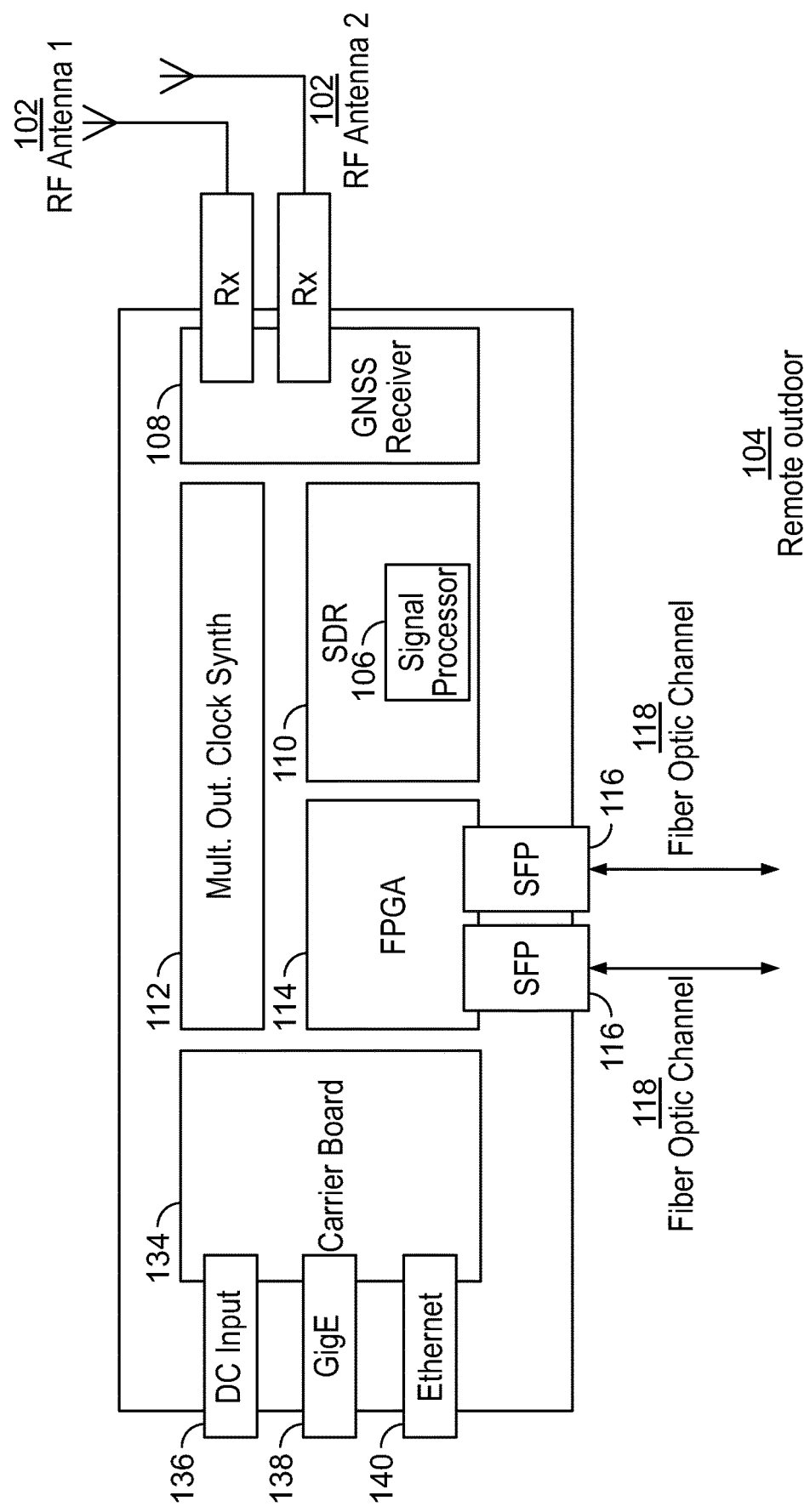
FIGS. 2A and 2B show detailed views of an exemplary remote outdoor unit.
Figure 2B:
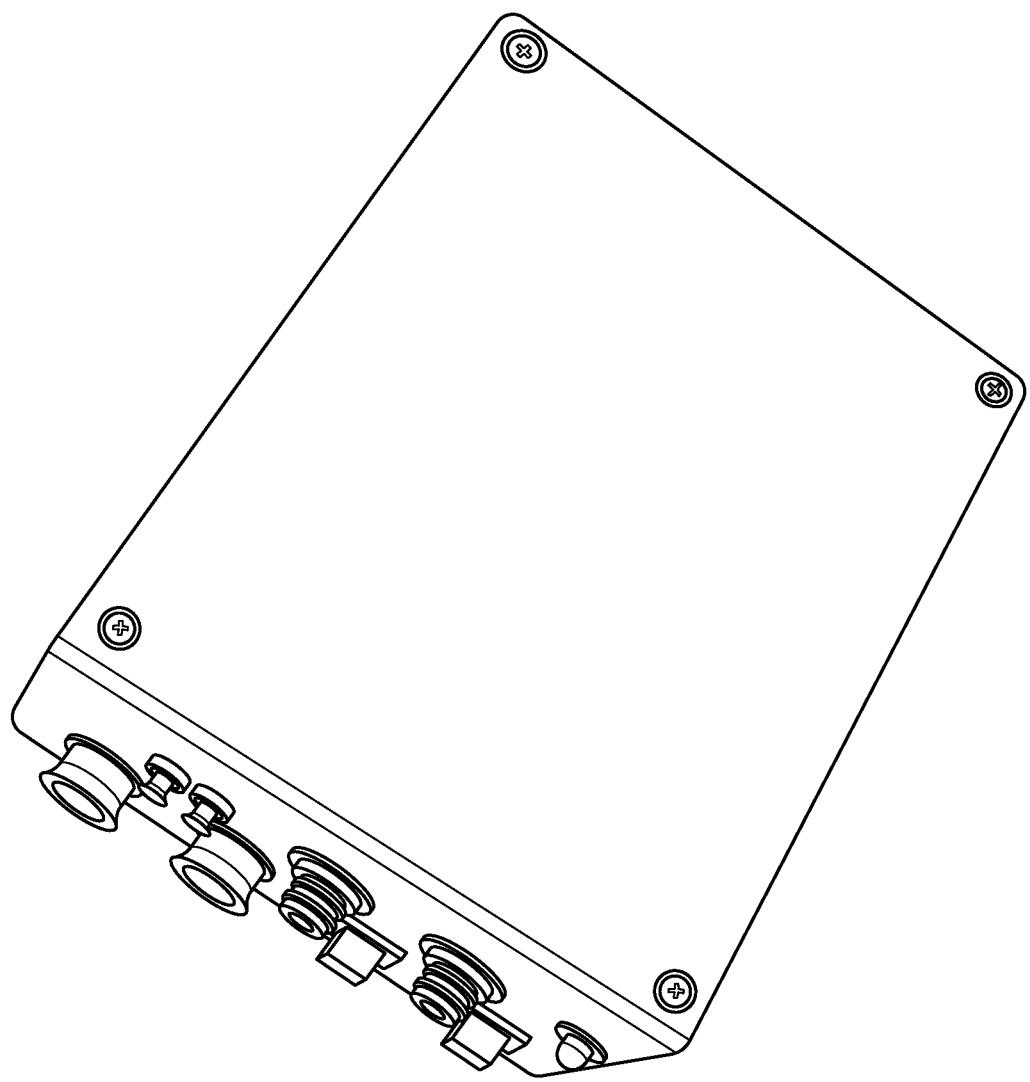

FIGS. 2A and 2B show detailed views of an exemplary remote outdoor unit 104. According to some embodiments, the remote outdoor unit 104 can include a signal processor 106, a GNSS receiver 108, a multiple-output clock synthesizer 112, a software defined radio (SDR) 110, a field-programmable gate array (FPGA) 114, and a first set of small form-factor pluggable (SFP) ports 116. The hardware can pre-condition the acquired RF signal received from the RF antenna 102. The pre-conditioning can include a saw filter and baseband low-pass filter that filters the RF signals in the analog domain. The GNSS receiver 108 processes the pre-conditioned RF signal and outputs a GPS-disciplined clock signal. The multiple-output clock synthesizer 112 processes the GPS-disciplined clock signal and generates a system clock signal using the GPS-disciplined clock signal.

The SDR 110 is configured to digitize the pre-conditioned RF signal into in-phase and quadrature (I/Q) antenna data. Digital filtering can be performed on the digitized signal, such as for example, a finite impulse response (FIR) filter and frequency shifting or translation using a numerically controlled oscillator (NCO). Converting the pre-conditioned RF from analog to digital enables the GNSS signals to be transported with significantly less signal degradation or distortion.

Figure 7:
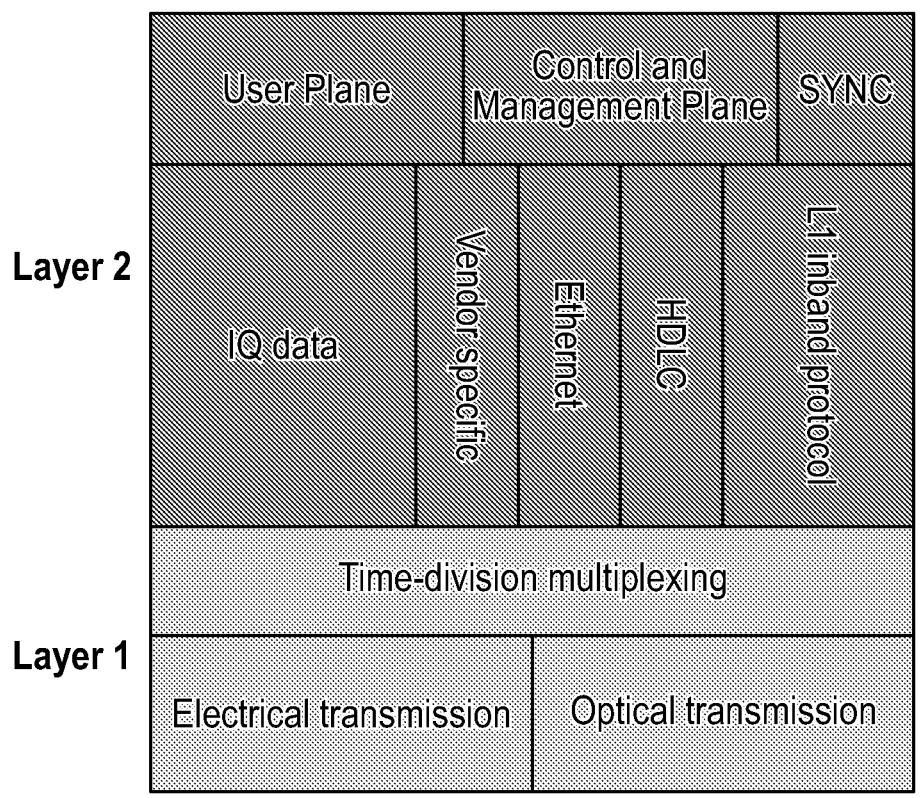
FIG. 7 illustrates an exemplary CPRI frame having a proprietary field according to some embodiments of the invention.

The FPGA 114 processes the I/Q antenna data into a digital signal formatted into a common public radio interface (CPRI) frame. The FPGA 114 also generates a timestamp based on the system clock signal, and inserts the timestamp into a proprietary field of the CPRI frame. For example, the timestamp can be inserted into the vendor-specific field of the exemplary CPRI frame shown in FIG. 7. The first set SFP ports 116 converts the digital signal comprising the formatted CPRI frame into an optical signal comprising the CPRI frame. The first SFP port can convert the digital signal using for example, LEDs, lasers, copper over fiber, and other suitable SFP-based technologies. The selection of SFP-based technology can depend on whether the fiber optic communication channels are single mode or multimode. The first set of SFP ports 116 can then output the optical signal comprising the CPRI frame.

In some embodiments, the remote outdoor unit 104 can include a carrier board 134. The carrier board 134 can include one or more standard GPIO connectors for interfacing the remote outdoor unit with other devices 142 and networks 144. For example, it can include MxM, HSMC, PCIe, USB, GigE, Ethernet, or other similar connectors, and any combination thereof. It can be modular and adaptable to enable flexibility when addressing different design requirements for different markets. The carrier board 134 can further include interfaces to connect to a power supply 146.

The fiber optic communication channel 118 couples the remote outdoor unit 104 to the indoor head end unit 120. The fiber optic communication channel 118 can transport the optical signal comprising the CPRI frame output by the first set of SFP ports 116 to the indoor head end unit 120. In some embodiments, the fiber optic communication channel 118 can be single mode or multi-mode based on the design requirements of the user. The use of fiber optic communication channels enables the redistribution of an RF signal over long distances where transporting such signals would otherwise not be possible.

In some embodiments, the system can include additional fiber optic channels that serve as redundant fiber optic communication channels. For example, GNSS repeater system can include a second fiber optic communication channel that is a redundant communication channel. Signals can be transported between the remote outdoor unit and indoor head end unit using both fiber optic communication channels simultaneously. If one of the fiber optic communication channels fails, the second redundant fiber optic communication channel can continue to transport signals between the remote outdoor unit and indoor head end unit without interruption.

Figure 3A:
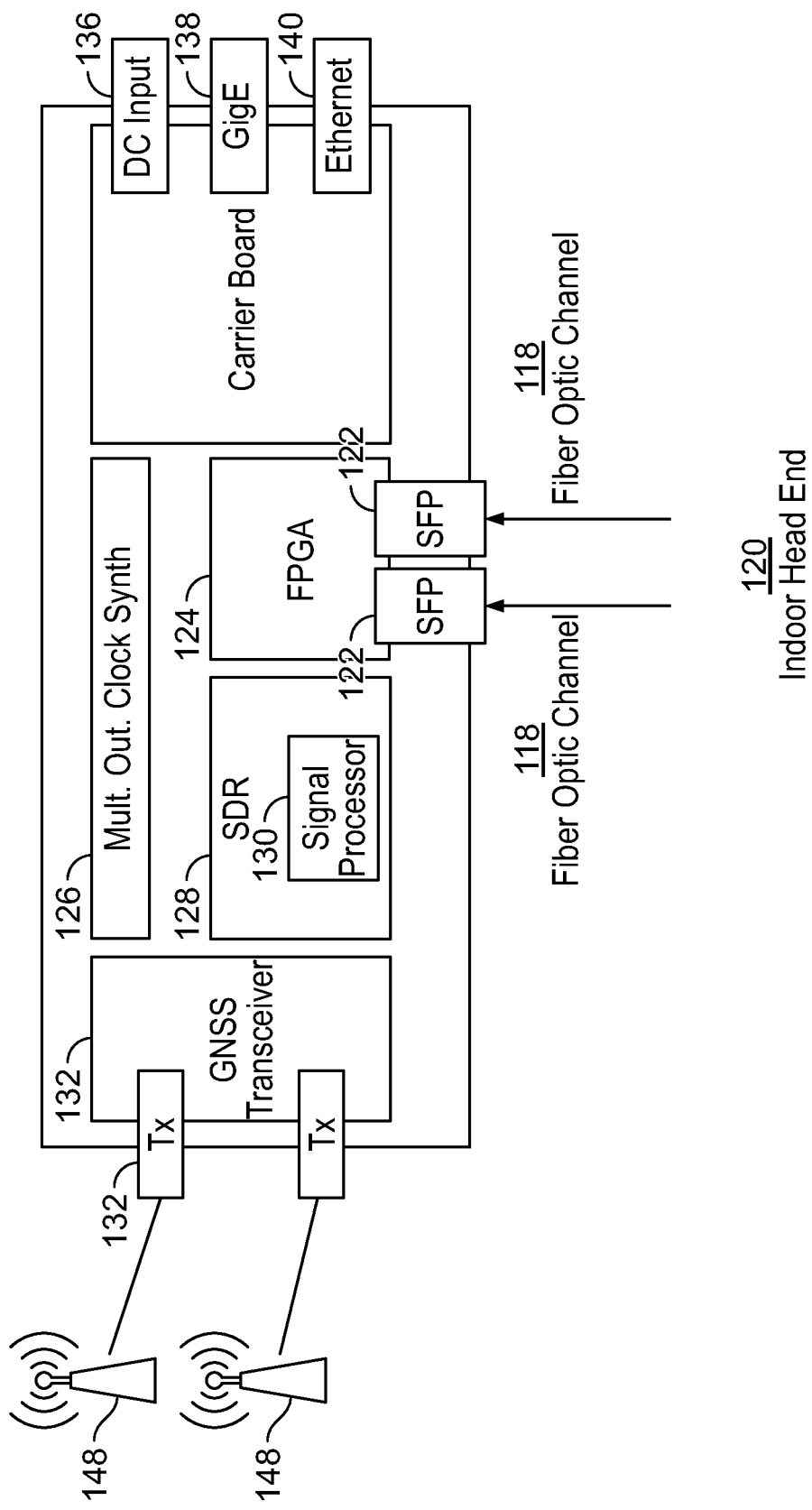
FIGS. 3A and 3B show detailed views of an exemplary indoor head end unit.
Figure 3B:
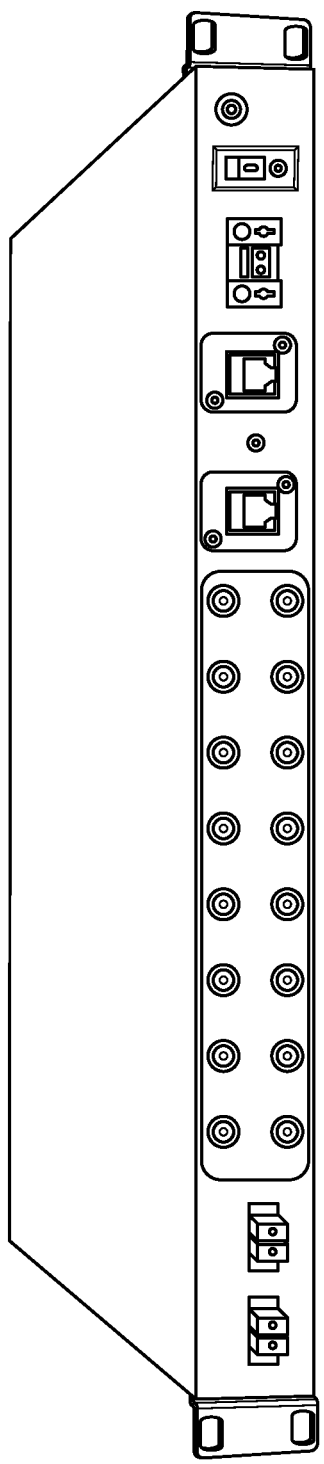

FIGS. 3A and 3B show detailed views of an exemplary indoor head end unit. According to some embodiments, the indoor head end unit 120 can include a second set of SFP ports 122, a second FPGA 124, a second multiple-output clock synthesizer 126, a second SDR 128, a second signal processor 130, and a head end output port 132. The second set of SFP ports 122 is configured to receive the optical signal comprising the CPRI frame, and convert the optical signal comprising the CPRI frame into a recovered digital signal. This can be done by for example using photodiodes or phototransistors. The second FPGA 124 extracts the CPRI frame from the recovered digital signal. It then extracts the timestamp from the CPRI frame, and decodes the CPRI frame into recovered I/Q antenna data. The second FPGA 124 can then output the timestamp and recovered I/Q antenna data. The second multiple-output clock synthesizer 126 is configured to generate a recovered clock signal. The recovered clock signal is output to the second FPGA 124, the second SDR 128, and the second signal processor 130. The second SDR 128 is configured to create a reconstructed RF signal based on the recovered I/Q antenna data. The second signal processor 130 can condition the reconstructed RF signal using the same filters as described above in connection with the remote outdoor unit. The head end output port 132 is configured to output the conditioned reconstructed RF signal to a BTS 148 and a PTP grand master 150 for example.

In some embodiments, the indoor head end unit 120 can include a GNSS transceiver 132. The GNSS transceiver 132 can reradiate the RF signal reconstructed using the second signal processor 130. As explained below, the GNSS transceiver of the indoor unit 132 can also be used to analyze GNSS signal quality and determine when GNSS signal performance is low.

The head end port 132 can include a set of RF outputs that can be coupled to one or more base transceiver station (BTS) 148 and a PTP grand master 150. For example, the head end output port 132 can be coupled to a multimedia communications exchange (MMCX) to a SubMiniature version A (SMA) RF connecter. The MMCX to SMA connector can then propagate the reconstructed RF signal from the indoor head end unit 120 to the BTS 148 and the PTP grand master 150. In some embodiments, the indoor head end unit can also include a carrier board 134 as described above. In some embodiments, the RF signal can be split into multiple RF outputs.

The reconstructed RF signal can be used to synchronize the BTS 148 and the PTP grand master 150 with the outdoor remote unit 104 by determining the communication delay in transporting the optical signal comprising the CPRI frame output by the first set of SFP ports 116 to the indoor head end unit 120. In some embodiments, GNSS Transceiver 132 outputs GPS time of day (TOD), a 10 MHz clock signal and a pulse per second (PPS) signal adjusted by the communication delay to a PTP grand master 150 instead of the reconstructed RF. In this way, the PTP grand master 150 can be integrated into the indoor head end unit 120.

In some embodiments, the communication delay is the delay of the CPRI frame in completing a round trip from a remote outdoor unit to an indoor head end unit, back to the remote outdoor unit. The communication delay can be measured using the timestamp inserted in the vendor specific field of the CPRI frame by calculating the difference between the timestamp and the time that the CPRI returned from the indoor head end unit. In some embodiments, the CPRI interface is configured with 2.4576 Gbps line bit rate and core clock rate of 61.44 MHz which provides 16.276 nanoseconds resolution, i.e., core clock period 1/61.44 MHz, for timestamp and communication delay measurements. In some embodiments, this calculation of the communication delay can be communicated to other indoor head end units in the GNSS repeater system so that an indoor head end unit may know its incoming accumulated delay.

In other embodiments, the indoor head end unit 120 can compare the timestamp inserted into the vendor specific field of the CPRI frame with a clock signal that provides the current time to the indoor head end unit and calculates the amount of time that has elapsed during the transport of the CPRI frame. This clock signal can be provided from an external source or from a clock that is internal to the indoor head end unit. The indoor head end unit 120 may further generate the reconstructed RF signal such that it has phase and frequency characteristics in alignment with the acquired RF signal.

The communication delay may be broken down into separate phases of the transport of the optical signal comprising the CPRI frame output by the first SFP set of ports 116 to the indoor head end unit 120. In this way, the communication delay can be calculated by one or more components of the GNSS repeater system separately or together in conjunction with one another. These phases can include an acquisition time, a transport time, and a transmit time. Acquisition time is the time associated with the RF signal being acquired and processed by the GNSS receiver 108, SDR 110, and FPGA 114 before being transported over the fiber optic communication channel 118. This can include the time associated with preconditioned, digitized, filtering, and frequency shifting the signal. Transport time is the time associated with packing the signal into a CPRI frame, converting the electrical signal into an optical signal, propagating the optical signal through the fiber optic communication channel, converting the optical signal back to an electrical signal, and unpacking the CPRI frame. The transmit time is associated with the time it takes for the signal to be transmitted to the GNSS transceiver 132, frequency shifted, filtered, and converted back to the RF analog domain. The total communication delay can be calculated by summing the acquisition time, transport time, and transmit time.

The clocks are configured with a level of precision that can measure and provide timestamps on the order of nanoseconds. Thus, embodiments of the invention can calculate communication delays within nanoseconds of accuracy. In this way, embodiments of the invention are capable of aligning the clock signals of the remote outdoor unit, a base transceiver station (BTS) 148 and PTP grand master 150 to meet 4G and 5G timing requirements, which are 1 microsecond, and 100 nanoseconds, respectively.

In some embodiments, the GNSS receiver 108 can include a multi-GNSS receiver IC for generating precise timing signals and an RF transceiver. The multi-GNSS receiver IC can be configured to receive GNSS signals from various different GNSS constellations, such as for example the GPS, GLONASS, BeiDou, or Galileo constellations. This enables the GNSS repeater to provide signal diversity by receiving and transporting signals for a different constellation, or combinations of constellations. For example, the multi-GNSS receiver IC can receive instructions to receive signals for different constellations without re-wiring or re-configuring the system.

The signal acquired from the RF antenna can be passed through a filter and LNA before being sent to the multi-GNSS receiver IC. According to some embodiments, the filter can be a SAW filter and the LNA can be an ultra-low noise bypass LNA. In some embodiments, signals are acquired from more than one RF antennae. Each signal can be filtered and amplified as described above. The signals can then be transported to an RF switch, which can selectively pass signals to and from the multi-GNSS receiver IC. In some embodiments, the RF switch can be a high isolation single pole double throw RF switch. The RF switch can be coupled to the multi-GNSS receiver IC, which generates precise timing signals. For example, the multi-GNSS receiver IC can generate pulse per second (PPS) and precise reference clock signals for synchronization of the GNSS repeater system. For example, the PPS and reference signals can be the GPS-disciplined clock that is output to the multiple-output clock synthesizer. The GNSS receiver 108 can further include a controller for configuring and routing analog and digital signals, including to and from the multi-GNSS receiver IC. The controller can be, for example, a programmable system on chip (SoC). The GNSS receiver 108 can also include a step down converter and inductor for providing accurate output voltage regulation. As described in more detail below, the GNSS receiver 108 can also include a current monitor for monitoring the RF antenna 102.

In some embodiments, the SDR 110 and 128 are mixed signal boards for converting RF signals to baseband signal (Rx) and baseband signals to RF signals (Tx). The SDR can include embedded software that implements radio communication system components that are typically otherwise implemented in hardware, such as for example, mixers, filters, amplifiers, modulators/demodulators, detectors, and other similar radio communication system components. In some embodiments, the SDR can be embedded on a field programmable RF (FPRF) transceiver integrated chip (IC). As shown in FIG. 2A, the signal processor 106 can be a component of the SDR 110. The signal processor 106 can filter and amplify the signals acquired by the RF antenna.

In some embodiments, the FPGAs 114 and 124 are CPRI interface boards. A CPRI interface board can include the multiple-output clock synthesizer 112 that processes the GPS-disciplined clock signal and generates a system clock signal. In the indoor head end unit, the CPRI interface board can include the multiple-output clock synthesizer 126 that generates a recovered clock signal from the incoming CPRI signal.

In some of the embodiments described above, references were made to the RF signal comprising a GPS signal. However, in some embodiments, the RF antenna is configured to receive RF signals in a frequency range that spans all other GNSS constellations. For example, in some embodiments, the RF antenna can receive RF signals in a frequency range between 1559 MHz-1610 MHz, and the GNSS receiver 108 can receive and decode signals from other GNSS constellations. Other GNSS constellations include the global navigation satellite system (GLONASS), BeiDou, and Galileo constellations. In some embodiments, the GNSS receiver can be configured to decode two distinct types of GNSS signals concurrently. For example, the GNSS receiver can decode GPS and GLONASS signals concurrently at the same time.

Similarly, in some of the embodiments described above, references were made to the indoor head end units 120 and outdoor remote units 104. However, in some embodiments, an indoor head end unit need not be physically located indoors, and can be installed in any location outside where the head end unit has an obstructed line of sight to the GPS constellation, or is otherwise incapable of receiving a signal from the GPS constellation. Likewise, in some embodiments, an outdoor remote unit need not be physically located outside, and can be installed in any location where the attached antenna has a line of sight to a GPS satellite, or is otherwise capable of receiving a signal from a GPS satellite.

In some embodiments, the presence of interference or jamming can be detected. A GNSS receiver 108 can be included both on-board the indoor head end unit 120 and on-board the outdoor remote unit 104. The GNSS receivers 108 then be used to track the performance of the GNSS signals. In some embodiments, an alarm can be triggered when a GNSS signal's performance has degraded below a threshold. Alarms can also be triggered when CPRI connection is down.

Figure 4:
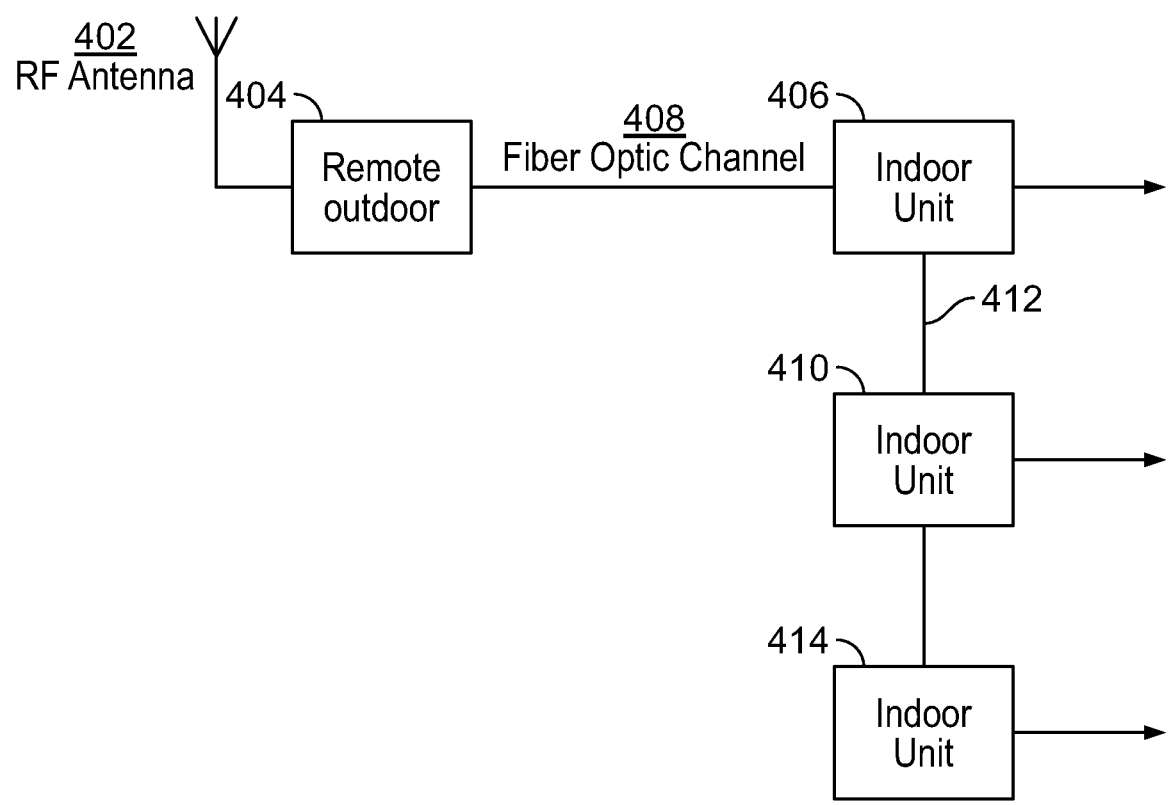
FIG. 4 shows an exemplary system of indoor head end units coupled together in a daisy-chain to an outdoor remote unit.

FIG. 4 shows an exemplary configuration of two or more indoor head end units coupled together in a daisy-chain to an outdoor remote unit. Daisy-chained configurations enable the GNSS signals to be transported from one location to multiple locations, and over large distances. As FIG. 4 shows, an RF antenna 402 is coupled to the remote outdoor unit 404 and the remote outdoor unit 404 is coupled to the indoor head end unit 406 by a fiber optic communication channel 408 in the same manner as described above. In some such embodiments, the system includes a second indoor head end unit 410 and a second fiber optic communication channel 412 coupling the first indoor head end unit 406 to the second indoor head end unit 410. The second fiber optic communication channel 412 communicates the reconstructed RF signal from the first indoor head end unit 406 to the second indoor head end unit 410. The second indoor head end unit 410 generates a second recovered clock signal based on the reconstructed RF signal.

The second recovered clock signal can be used to synchronize the second indoor head end unit 410 with the first indoor head end unit 406 by aligning phase and frequency of the second recovered clock signal with the GPS-disciplined clock in a similar manner as described above. The additional delay caused by the second fiber optic communication channel 412 and second indoor head end unit 410 can be determined in a similar manner as the first optic communication channel 408. For example, the communication delay can be calculated for transporting the optical signal comprising the CPRI frame output by the first set of SFP ports to the first indoor head end unit 406, and from the first indoor head end unit 406 to the second indoor head end unit 410. The communication delay can be determined using the timestamp inserted in the CPRI frame in the same manner as described above. The second recovered clock signal synchronizes the second indoor head end unit 410 with the first indoor head end unit 406 using the second recovered clock signal. The second indoor head end unit 410 can then generate a second reconstructed RF signal that is synchronized with the first reconstructed RF signal, and where the phase and frequency characteristics are in alignment. The second indoor head end unit 410 can then output a second reconstructed RF signal in the same manner as described above.

In some embodiments, the total communication delay for the second indoor head end unit is calculated by summing the communication delay caused by the first fiber optic communication channel 408 with the communication delay caused by the second fiber optic communication channel 412.

Additional indoor head end units 414 can be continuously daisy-chained to the second indoor head end unit 410. The communication delay at each indoor head end unit can be calculated by summing the communication delay for each previous indoor head end unit. For example, the communication delay for a third indoor head end unit 414 can be calculated by summing the communication delay for the second indoor head end unit 410 and first indoor head end unit 406. In this way, a GNSS signal can be transported through several indoor head end units to cover large distances (which would incur significant timing delays) by tracking, calculating, and compensating for the total communication delay.

Figure 5A:
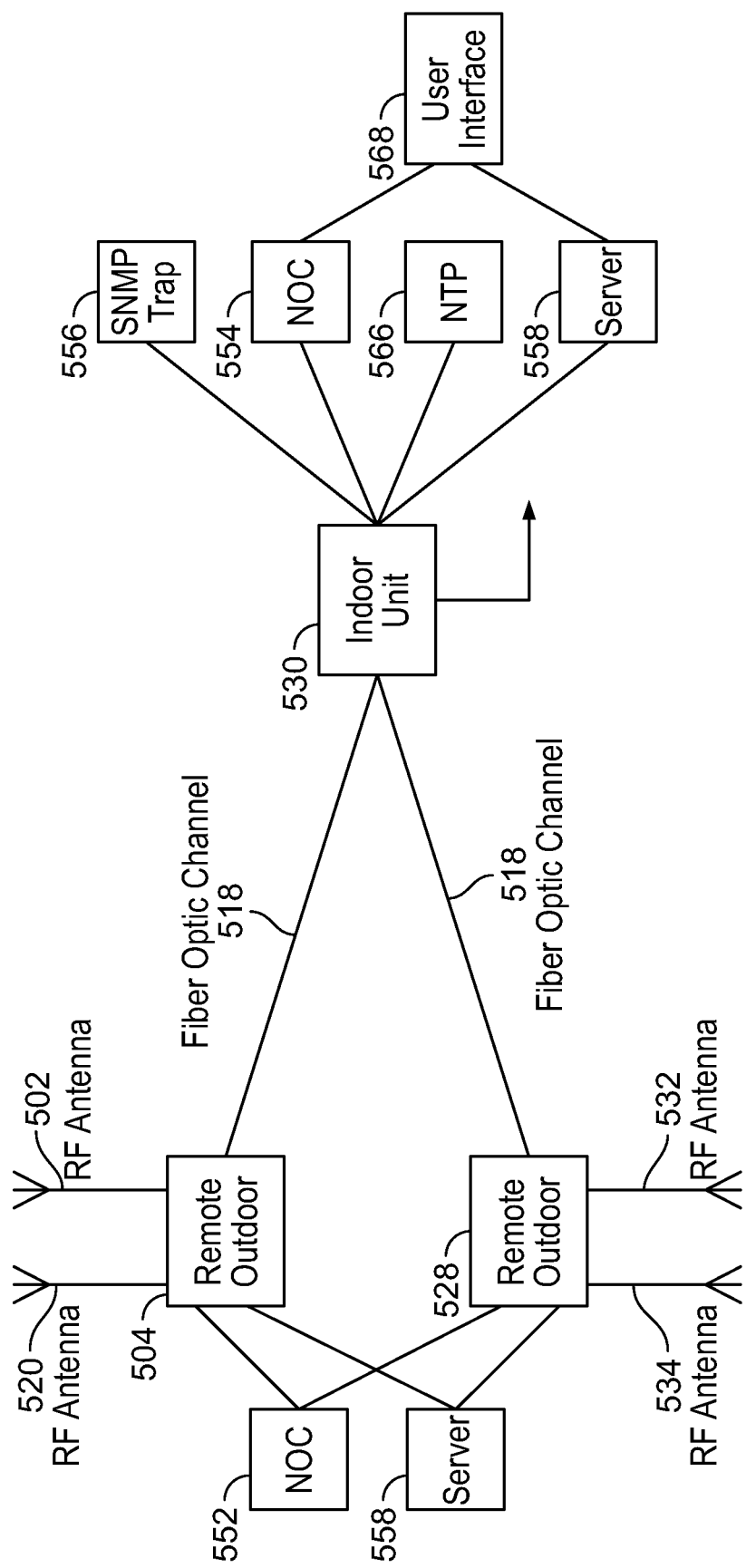
FIGS. 5A and 5B show an exemplary system for providing antenna and spatial redundancy according to some embodiments of the invention.

In some embodiments, a remote outdoor unit 104 can be coupled to more than one RF antennae to provide antenna redundancy. For example, as shown in FIG. 5A, a remote outdoor unit 504 can be the same as the remote outdoor units described above, and further can be coupled to a first RF antenna 502 and a second RF antenna 520. The exemplary system in FIG. 5B further shows a current-monitoring circuit 522, and a switch 524. The current-monitoring circuit 522 includes a voltage input pin, sensing pin, and output pin, and determines the current flowing through the circuit. The switch 524 selectively provides the RF signal acquired from the first or second RF antennae 502, 520 to the signal processor 506.

By default, the switch will couple either the first or second RF antennae 502, 520 to the signal processor. Whether it is the first or second RF antenna that is coupled to the signal processor by default, the GNSS receiver 508 will determine the signal health of its signals based on the signal-to-noise ratios (SNR) and current levels measured by the current-monitoring circuit. The GNSS receiver can continuously monitor the health of these signals and detect when a fault has occurred in the RF antennae. In this way, signal analysis of a GNSS signal can be performed on the GNSS repeater system itself. When the GNSS receiver 508 determines that a fault has occurred in an RF antenna because of poor SNR, or the presence of a short, or the presence of an open circuit, the switch 524 can toggle between the antennae and couple the other RF antenna to the signal processor 506. In this way, the system enables antenna redundancy for when an RF antenna becomes faulty or degrades in performance. Additional RF antennae can be coupled to add further redundancy, and the switch 524 can be adapted accordingly to however many RF antennae are needed to provide the desired level redundancy.

In some embodiments, the GNSS receiver 508 determines when there has been a fault in the RF antenna by determining when the SNR has fallen below a threshold. The threshold can be set automatically with a GPS monitor that provides a valid GPS lock and switch over. For example, the system can monitor the number of GPS satellites, and create a mask based on at least the following parameters: 1) the Signal to Noise Ratio (SNR) level, measured in dB; 2) Position Dilution of Precision (PDOP) value, which corresponds to the measure of the geometrical strength of the GPS satellite configuration measured in a decimal value; and 3) elevation of the satellites relative to the horizon, measured in degrees. These parameters are variables in the system that can be adjusted based on the sensitivity of the GPS alarm. The higher the number, the more sensitive the mask, while the lower number, the less sensitive the mask. When there are less than 4 satellites passing the mask, an alarm is triggered and the antenna can switch over.

Figure 5B:
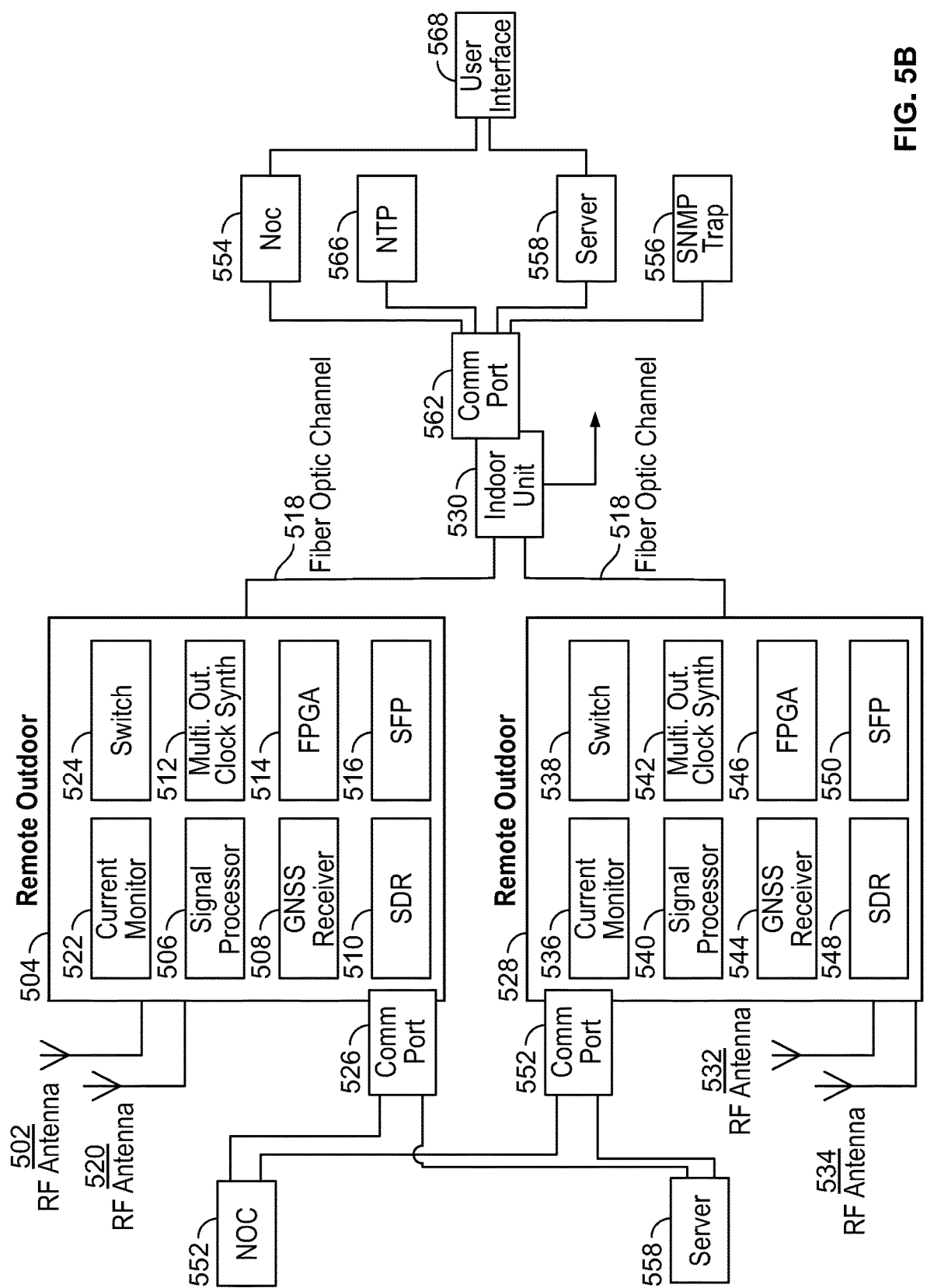

In some embodiments, additional remote outdoor units 528 can be coupled to the indoor head end unit 530 to provide spatial redundancy, each of which can include one or more RF antennae. For example, as shown in FIG. 5A, a second remote outdoor unit 528 can be coupled to the indoor head end unit 530. The second remote outdoor unit 528 can be the same as the remote outdoor units described above. As shown in FIG. 5B, the second remote outdoor unit 528 can be coupled to a third RF antenna 532 and a fourth RF antenna 534. The third RF antenna 532 acquires a third RF signal and the fourth RF antenna 534 acquires a fourth RF signal. A second current monitoring circuit 536 and second switch 538 can be coupled to the second remote outdoor unit 528. The second switch 538 can selectively provide the third RF signal or fourth RF signal to the signal processor of the second remote outdoor unit 528. Like the GNSS receiver described above, the GNSS receiver of the second remote outdoor unit 544 can determine the signal health and SNR of the third and fourth RF signals. The indoor head end 530 unit can then select which RF signal acquired from the four RF antennae to receive based on which one has the best measure of signal health and SNR.

The additional remote outdoor units can be placed in different physical locations. In this way, the GNSS repeater system can provide spatial diversity.

Signal information about the RF antennae, such as for example signal health and SNR, can be output for administrative or managerial oversight using one or more communication ports 526, 552. For example, the one or more communication ports 552 can be coupled to a network operation center (NOC) 554, and when the GNSS receiver 508, 544 determines there has been a fault in an RF antenna, the GNSS receiver 508, 544 can communicate an alert to the NOC. In this way the NOC can be alerted of a fault in an RF antennae immediately, in real-time or near real-time.

In some embodiments, the communication port 526, 552 can send signal information pertaining to the RF antennae as alerts to a simple network management protocol (SNMP) trap manager 556. The remote outdoor unit acting as an SNMP agent can report alerts based on signal information as SNMP messages to the SNMP manager, which may be for example a remote server or NOC. The SNMP traps may be communicated as they occur in real or near real-time. The SNMP trap manager can collect the SNMP trap messages and create logs of faults detected in the RF antennae. SNMP traps can be "granular traps" and have a unique identification number, or object identifier (OID) that allows the SNMP manager to distinguish them from each other. SNMP traps can also have the same OID, but incorporate alert data within the traps themselves. Data can be encoded within the SNMP trap utilizing a key-value pair configuration.

The communication port 526, 552 can also report signal information pertaining to the RF antennae over an internet interface. For example, the communication port can be an Ethernet cable and the signal information pertaining to the RF antennae can be transmitted to a remote server 558 as an HTTP packet.

In some embodiments, the indoor head end unit 530, 560 can also have a communication port 562, 564 for outputting information about the signals it has received. For example, the communication port 562, 564 can be coupled to a network time protocol (NTP) server 566. An NTP server 566 can be used to synchronize the clock signals of the remote outdoor units and the indoor head end units. The recovered clock signal can be a reference timing signal for the NTP server.

The communication port 562, 564 can also include an Ethernet port, and can be coupled to a NOC 554 or remote server 558 in the same manner as described above. The NOC 554 or remote server 558 can further include a user interface 568 that displays information related to the RF antennae 502, 520, 532, 534, the remote outdoor units 504, 528, and the indoor head end units 530, 560. For example, the user interface can display signal health, SNR, whether RF antennae have faulted, communication delay time, and other information about the system.

The user interface 568 can also be configured control certain aspects of the RF antennae 502, 520, 532, 534, remote outdoor units 504, 528, and the indoor head end units 530, 560. For example, the user interface can control frequency bandwidths acquired by the RF antennae.

In some embodiments, the communications port 562, 564 of the indoor head end unit includes an Ethernet port that enable a user to debug the indoor head end unit. Using an Ethernet cable to connect the indoor head end unit 530, 560 to a user's computer, the user can access and navigate the elements of the indoor head end unit 530, 560. For example, the user can open and view files generated and stored by the GNSS receivers, SDRs, FPGAs, signal processors, multiple output clock synthesizers, current monitors, and switches. The user can also invoke certain functions and calls from the debugging interface to test their performance. The user can further input commands to operating systems embedded in any one of these components. For example, an embedded Linux distribution can be installed on one or more of these components, and can receive and respond to commands input through the debugging interface.

Figure 6:
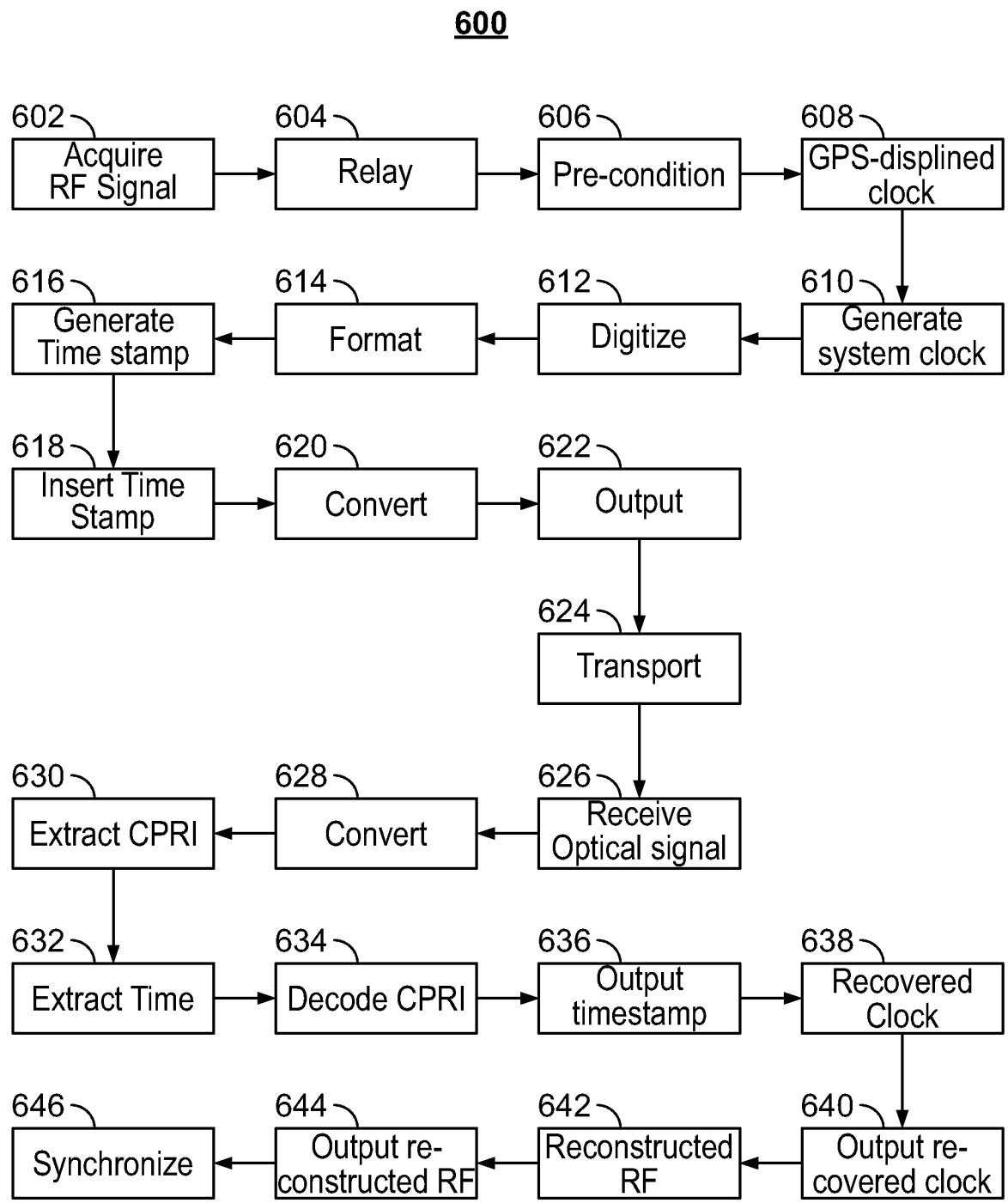
FIG. 6 illustrates an exemplary method for improving phase and frequency alignment of RF signals transported through fiber optic communication channels in a GNSS repeater system.

FIG. 6 illustrates an exemplary method 600 for improving phase and frequency alignment of radio frequency (RF) signals transported through fiber optic communication channels in a GNSS repeater system. This can include the following steps. In step 602, the method acquires an RF signal using an RF antenna. In step 604, the acquired RF signal is relayed to a remote outdoor unit. The acquired RF signal can include a GPS signal. In step 606 the acquired RF signal is pre-conditioned using a signal processor at the remote outdoor unit. In step 608, a GPS-disciplined clock signal is generated using a GNSS receiver based on the pre-conditioned RF signal. In step 610, a system clock signal is generated using a multiple-output clock synthesizer based on the GPS-disciplined clock signal. In step 612, the pre-conditioned RF signal is digitized using a SDR into I/Q antenna data. In step 614, the digitized RF signal is formatted using an FPGA into a CPRI frame. In step 616, a timestamp is generated based on the system clock signal. In step 618, the timestamp is inserted into a proprietary field of the CPRI frame. In step 620, the digitized RF signal comprising the formatted CPRI frame is converted into an optical signal comprising the CPRI frame using a first small form-factor pluggable (SFP) port. In step 622, the optical signal comprising the CPRI frame is then output. In step 624, the optical signal comprising the CPRI frame is transported over a fiber optic communication channel.

In step 626, the optical signal comprising the CPRI frame is received using a second SFP port at an indoor head end unit. In step 628, the optical signal comprising the CPRI frame is converted into a recovered digital signal. In step 630, the CPRI frame is extracted from the recovered digital signal using a second FPGA. In step 632, the timestamp is extracted from the CPRI frame. In step 634, the CPRI frame is decoded into recovered I/Q antenna data. In step 636, the timestamp and recovered I/Q antenna data is output. In step 638, a recovered clock signal is generated using a second multiple-output clock synthesizer from the recovered digital signal and the communication delay is determined based on the timestamp. In step 640, the recovered clock signal is output to the second FPGA, the second SDR, and the second signal processor. In step 642, a reconstructed RF signal is created based on the recovered I/Q antenna data using a second SDR. In step 644, the reconstructed RF signal is conditioned using a second signal processor, and output using a head end output port.

In step 646, the indoor head end unit is synchronized with the outdoor remote unit by aligning phase and frequency of the recovered clock signal with the GPS-disciplined clock signal. Similarly, the reconstructed RF signal can be generated to have phase and frequency characteristics in alignment with the acquired RF signal in the same manner as described above. The reconstructed RF signal output and the communication delay based on the timestamp inserted in the CPRI frame are used by to one or more BTS and PTP grand master to synchronize with the remote outdoor unit. In some embodiments, the reconstructed RF signal is output to the second GNSS receiver which in turn outputs time of day (TOD), pulse per second (PPS) and 10 MHz clock signals to a IEEE 1588 PTP grand master to synchronize with the acquired GPS signal at the remote outdoor unit.

The embodiments described herein can be used for commercial, public safety, or military applications. The system can be used for cellular communication timing, network timing, or for providing indoor location services where the GPS signals are not readily available.

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and/or comprise a mixture of both hardware and software elements. Accordingly, while various novel features of the inventive principles have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps of any described methods may be carried out in different orders in many cases where such may be appropriate. Those skilled in the art will recognize, based on the above disclosure and an understanding therefrom of the teachings of the inventive principles, that the particular hardware and devices that are part of the system described herein, and the general functionality provided by and incorporated therein, may vary in different embodiments of the inventive principles. Accordingly, the particular system components are for illustrative purposes to facilitate a full and complete understanding and appreciation of the various aspects and functionality of particular embodiments of the present principles as realized in system and method embodiments thereof. Those skilled in the art will appreciate that the inventive principles can be practiced in other than the described embodiments, which are presented for purposes of illustration and not limitation.

The invention claimed is:

1. A global navigation satellite system (GNSS) repeater system for improving phase and frequency alignment of radio frequency (RF) signals transported through fiber optic communication channels, the GNSS repeater system comprising:
   an RF antenna for acquiring an RF signal and relaying the acquired RF signal to a remote outdoor unit, wherein the RF signal comprises a global positioning system (GPS) signal;
   a remote outdoor unit coupled to the RF antenna, the remote outdoor unit comprising a signal processor, a GNSS receiver, a software defined radio (SDR), a multiple-output clock synthesizer, a field-programmable gate array (FPGA), and a first small form-factor pluggable (SFP) port, wherein:
      the signal processor is configured to pre-condition the acquired RF signal received from the RF antenna,
      the GNSS receiver is configured to process the pre-conditioned RF signal and output a GPS-disciplined clock signal,
      the multiple-output clock synthesizer is configured to process the GPS-disciplined clock signal and generate a system clock signal,
      the SDR is configured to digitize the pre-conditioned RF signal into in-phase and quadrature (I/Q) antenna data,
      the FPGA is configured to process the I/Q antenna data into a digital signal formatted into a common public radio interface (CPRI) frame, generate a timestamp based on the system clock signal, and insert the timestamp into a proprietary field of the CPRI frame, and
      the first SFP port is configured to convert the digital signal comprising the formatted CPRI frame into an optical signal comprising the CPRI frame, and output the optical signal comprising the CPRI frame;
   a fiber optic communication channel for transporting the optical signal comprising the CPRI frame; and
   an indoor head end unit, coupled to the remote outdoor unit over the fiber optic communication channel, the indoor head end unit comprising a second SFP port, a second FPGA, a second multiple-output clock synthesizer, a second SDR, a second signal processor, and a head end output port, wherein:
      the second SFP port is configured to receive the optical signal comprising the CPRI frame, and convert the optical signal comprising the CPRI frame into a recovered digital signal,
      the second FPGA is configured to extract the CPRI frame from the recovered digital signal, extract the timestamp from the CPRI frame, decode the CPRI frame into recovered I/Q antenna data, and output the timestamp and recovered I/Q antenna data,
      the second multiple-output clock synthesizer is configured to generate a recovered clock signal, and the recovered clock signal is output to the second FPGA, the second SDR, and the second signal processor,
      the second SDR is configured to create a reconstructed RF signal based on the recovered I/Q antenna data,
      the second signal processor is configured to condition the reconstructed RF signal, and
      the head end output port is configured to output the conditioned reconstructed RF signal,
   wherein the timestamp inserted in the CPRI frame is used to determine the communication delay between the remote outdoor unit and the indoor head end unit, and
   wherein the reconstructed RF signal has phase and frequency characteristics in alignment with the acquired RF signal.

2. The system of claim 1, wherein the communication delay is determined based on calculating an acquisition time, transport time, and transmit time.

3. The system of claim 1, wherein the communication delay is determined within (1/61.44 MHz) nanoseconds of resolution.

4. The system of claim 1, wherein the communication delay between the remote outdoor unit and the indoor head end unit are within a 1 microsecond accuracy.

5. The system of claim 1, wherein the communication delay between the remote outdoor unit and the indoor head end unit are within a 100 nanosecond accuracy.

6. The system of claim 1, wherein the RF antenna is configured to receive RF signals in a frequency range between 1559 MHz-1610 MHz.

7. The system of claim 1, wherein the GNSS receiver is a GNSS receiver compatible with a GNSS constellation selected from the group consisting of GPS, global navigation satellite system (GLONASS), BeiDou, and Galileo.

8. The system of claim 7, wherein the GNSS receiver is configured to decode two distinct types of GNSS signals concurrently.

9. The system of claim 1, wherein the system detects the presence of interference or jamming.

10. The system of claim 1, wherein the indoor head end unit is a first indoor head end unit, the fiber optic communication channel is a first fiber optic communication channel, and the system further comprises:
   a second indoor head end unit, wherein the reconstructed RF signal is a first reconstructed RF signal and the second indoor head end unit is configured to output a second reconstructed RF signal; and
a second fiber optic communication channel coupling the first indoor head end unit to the second indoor head end unit,
wherein the second fiber optic communication channel communicates the reconstructed RF signal from the first indoor head end unit to the second indoor head end unit,
wherein the second indoor head end unit generates a second recovered clock signal based on the reconstructed RF signal,
wherein the communication delay is determined by the timestamp inserted in the CPRI frame, and the communication delay is based on delays caused by the first fiber optic communication channel and the second fiber optic communication channel, and
wherein the second reconstructed RF signal has phase and frequency characteristics in alignment with the acquired RF signal.

11. The system of claim 1, wherein the communication delay is determined by calculating a first delay caused by the first fiber optic communication channel, calculating a second delay caused by the second fiber optic communication channel, and adding the first delay to the second delay.

12. The system of claim 1, wherein the RF antenna is a first RF antenna, the system further comprising:
a second RF antenna coupled to the remote outdoor unit, wherein the first RF antenna acquires a first RF signal and the second RF antenna acquires a second RF signal;
a current monitoring circuit;
a switch for selectively providing the first RF signal or the second RF signal to the signal processor,
wherein the GNSS receiver is configured to: determine a signal health of the first acquired RF signal based on the signal-to-noise ratio (SNR) of the first acquired RF signal and the current-monitoring circuit, monitor the signal health of the first acquired RF signal, and detect a fault in the first RF antenna based on the signal health of the first acquired RF signal,
wherein the switch provides the second RF signal to the signal processor upon detecting a fault in the first RF antenna.

13. The system of claim 12, wherein the fault in the first RF antenna is based on the SNR falling below a threshold.

14. The system of claim 12, further comprising a communication port, wherein the communication port reports the detected fault in the first RF signal.

15. The system of claim 14, wherein the communication port reports the detected fault as an SNMP trap message.

16. The system of claim 14, wherein the communication port reports the detected fault over an internet interface.

17. The system of claim 12, wherein the remote outdoor unit is a first remote outdoor unit, and the system further comprises:
a second remote outdoor unit coupled to the indoor head end unit, the second remote outdoor unit comprising:
a third RF antenna and a fourth RF antenna coupled to the second remote outdoor unit, wherein the third RF antenna acquires a third RF signal, the fourth RF antenna acquires a fourth RF signal, the current monitoring circuit is a first current monitoring circuit, the switch is a first switch, the GNSS receiver is a first GPS receiver, and the signal processor is a first signal processor,
a second current monitoring circuit,
a second switch for selectively providing the third RF signal or the fourth RF signal to a second signal processor,
a second GNSS receiver, wherein the second GNSS is a second GPS receiver and is configured to determine a signal health of the third acquired RF signal based on the signal-to-noise ratio (SNR) of the third acquired RF signal and the second current-monitoring circuit, monitor the signal health of the third acquired RF signal, and
wherein the indoor head end unit selects an RF signal from the first remote outdoor unit and the second remote outdoor unit based on the signal health of the first RF signal, the second RF signal, the third RF signal, and the fourth RF signal.

18. The system of claim 1, further comprising a network time protocol (NTP) server coupled to the indoor head end unit and wherein the recovered clock signal is a reference timing signal for the NTP server.

19. The system of claim 1, wherein the indoor head end unit comprises an Ethernet port for communicating to a network operations center (NOC).

20. The system of claim 19, wherein the NOC is coupled to the indoor head end unit, and the NOC comprising a user interface is configured to display information related to the RF antenna, the remote outdoor unit, and the indoor head end unit.

21. The system of claim 20, wherein the user interface is further configured to control the RF antenna, the remote outdoor unit, and the indoor head end unit.

22. The system of claim 21, wherein the user interface is further configured to control frequency bandwidths acquired by the RF antenna.

23. The system of claim 1, wherein the indoor head end unit comprises an Ethernet port configured to debug the indoor head end unit.

24. The system of claim 1, wherein the RF antenna is an active antenna or passive antenna.

25. The system of claim 1, wherein the indoor head end unit comprises a set of RF outputs, and the set of RF outputs are coupled to one or more base transceiver stations (BTS).

26. The system of claim 1, wherein the indoor head end unit comprises a set of RF outputs, and the set of RF outputs are coupled to a precision time protocol (PTP) grand master.

27. The system of claim 1, wherein the indoor head end unit comprises a second GNSS receiver which receives the reconstructed RF signal and the determined communication delay and outputs time of day (TOD), pulse per second (PPS) and 10 MHz clock signals to a precision time protocol (PTP) grand master.

28. The system of claim 1, wherein the fiber optic communication channel is a first fiber optic communication channel, and the system further comprises a second fiber optic communication channel that is a redundant communication channel, wherein the signals are transported between the remote outdoor unit and indoor head end unit simultaneously, and when the first fiber optic communication channel fails, the second fiber optic communication channel continues to transport signals between the remote outdoor unit and indoor head end unit without interruption.

29. A method for improving phase and frequency alignment of radio frequency (RF) signals transported through fiber optic communication channels in a global navigation satellite system (GNSS) repeater system, the method comprising:

acquiring an RF signal using an RF antenna, wherein the RF signal comprises a global positioning system (GPS) signal;

relaying the acquired RF signal to a remote outdoor unit;

pre-conditioning the acquired RF signal using a signal processor;

generating a GPS-disciplined clock signal using a GNSS receiver, the GPS-disciplined clock signal being based on the pre-conditioned RF signal;

generating a system clock signal using a multiple-output clock synthesizer, the system clock signal being based on the GPS-disciplined clock signal;

digitizing the pre-conditioned RF signal using a software defined radio (SDR) into in-phase and quadrature (I/Q) antenna data;

formatting the digitized RF signal using an field-programmable gate array (FPGA) into a common public radio interface (CPRI) frame;

generating a timestamp based on the system clock signal;

inserting the timestamp into a proprietary field of the CPRI frame;

converting the digitized RF signal comprising the formatted CPRI frame into an optical signal comprising the CPRI frame using a first small form-factor pluggable (SFP) port;

transporting the optical signal comprising the CPRI frame over a fiber optic communication channel from the first SFP port to a second SFP at an indoor head end unit;

converting the optical signal comprising the CPRI frame into a recovered digital signal;

extracting the CPRI frame from the recovered digital signal using a second FPGA;

extracting the timestamp from the CPRI frame;

decoding the CPRI frame into recovered I/Q antenna data;

outputting the timestamp and recovered I/Q antenna data;

generating a recovered clock signal from the recovered digital signal using a second multiple-output clock synthesizer;

outputting the recovered clock signal to the second FPGA, the second SDR, and the second signal processor;

creating a reconstructed RF signal based on the recovered I/Q antenna data using a second SDR;

conditioning the reconstructed RF signal using a second signal processor;

outputting the conditioned reconstructed RF signal using a head end output port; and wherein the reconstructed RF signal has phase and frequency characteristics in alignment with the acquired RF signal.

\* \* \* \* \*